United States Patent
Williams (12) United States Patent (10) Patent No.: US 10,655,689 B2
(45) Date of Patent: May 19, 2020

(54) DECOUPLER WITH OVERRUNNING AND BELT-START CAPABILITY WITH SIMPLIFIED CONSTRUCTION

(71) Applicant: Litens Automotive Patnership, Woodbridge (CA)

(72) Inventor: Warren J. Williams, Oakville (CA)

(73) Assignee: Litens Automotive Partnership, Woodbridge (CA)

(*) Notice: Subject to any disclaimer, the term of this patent is extended or adjusted under 35 U.S.C. 154(b) by 381 days.

(21) Appl. No.: 15/037,034

(22) PCT Filed: Nov. 14, 2014

(86) PCT No.: PCT/CA2014/000818
§ 371 (c)(1),
(2) Date: May 16, 2016

(87) PCT Pub. No.: WO2015/070329
PCT Pub. Date: May 21, 2015

(65) Prior Publication Data
US 2016/0298703 A1   Oct. 13, 2016

Related U.S. Application Data

(60) Provisional application No. 61/904,292, filed on Nov. 14, 2013.

(51) Int. Cl.
*F16D 41/067* (2006.01)
*F02B 67/06* (2006.01)
(Continued)

(52) U.S. Cl.
CPC ............ *F16D 41/067* (2013.01); *B60K 25/02* (2013.01); *F02B 67/06* (2013.01); *F16D 27/02* (2013.01);
(Continued)

(58) Field of Classification Search
CPC ........ F16D 41/067; F16D 41/06; F16D 41/08; F16D 41/085; F16D 27/02; F16D 27/025;
(Continued)

(56) References Cited

U.S. PATENT DOCUMENTS 3,019,871 A   2/1962   Sauzedde
3,812,936 A   5/1974   Dane
(Continued)

FOREIGN PATENT DOCUMENTS

CN   1393645 A   1/2003
CN   1856664 A   11/2006
(Continued)

OTHER PUBLICATIONS

Office Action for CN201480062465.8 dated Feb. 5, 2018.
(Continued)

*Primary Examiner* — Jacob S. Scott
*Assistant Examiner* — Lori Wu
(74) *Attorney, Agent, or Firm* — Millman IP Inc.

(57) ABSTRACT

In an aspect, a clutched device is provided, including a hub, a pulley and a roller clutch. The roller clutch includes at least one roller and a cage. The roller is engageable with a first engagement surface operatively associated with the hub and is engageable with a second engagement surface operatively associated with the pulley. The cage is movable between a first position in which torque is transferrable from one of the hub and the pulley to the other of the hub and the pulley through the roller clutch and the isolation spring. The other of the hub and the pulley is permitted to overrun said one of the hub and the pulley, and a second position in which torque is transferred from said other of the hub and the pulley to the one of the hub and the pulley through the roller clutch.

11 Claims, 8 Drawing Sheets

(51) Int. Cl.
   *F16H 55/36* (2006.01)
   *B60K 25/02* (2006.01)
   *F16D 27/02* (2006.01)
   *F16F 15/123* (2006.01)
   *F16H 7/08* (2006.01)
   *F16D 3/12* (2006.01)
   *F02N 11/04* (2006.01)

(52) U.S. Cl.
   CPC ......... *F16F 15/123* (2013.01); *F16H 7/0827* (2013.01); *F16H 55/36* (2013.01); *F02N 11/04* (2013.01); *F16D 3/12* (2013.01); *F16D 2300/22* (2013.01); *F16H 2055/366* (2013.01)

(58) Field of Classification Search
   CPC .................. F16D 27/108; F16D 13/76; F16D 2041/0608; B60K 25/02; F02B 67/06; F16H 7/0827; F16H 55/36
   See application file for complete search history.

(56) References Cited

U.S. PATENT DOCUMENTS

| | | | |
|---|---|---|---|
| 3,865,222 | A | 2/1975 | Briar |
| 4,570,758 | A | 2/1986 | Hendricks |
| 4,867,291 | A | 9/1989 | Holman et al. |
| 5,085,306 | A | 2/1992 | Beigang |
| 5,275,261 | A | 1/1994 | Vranish |
| 5,517,957 | A | 5/1996 | Wagner et al. |
| 5,638,931 | A | 6/1997 | KerrHU |
| 6,083,130 | A | 7/2000 | Mevissen et al. |
| 6,582,333 | B2 | 6/2003 | Man et al. |
| 6,698,563 | B2 | 3/2004 | Handa et al. |
| 6,755,763 | B1 | 6/2004 | Goto et al. |
| 6,766,888 | B2 | 7/2004 | Yasui et al. |
| 6,832,970 | B2 | 12/2004 | Eibler |
| 6,871,735 | B2 | 3/2005 | Kawai et al. |
| 6,955,141 | B2 | 10/2005 | Santanam et al. |
| 7,114,585 | B2 | 10/2006 | Man et al. |
| 7,543,454 | B2 | 6/2009 | Harris |
| 7,591,357 | B2 | 9/2009 | Antchak et al. |
| 7,618,337 | B2 | 11/2009 | Jansen et al. |
| 7,624,852 | B2 | 12/2009 | Mevissen et al. |
| 7,654,375 | B2 | 2/2010 | Okada et al. |
| 8,166,945 | B2 | 5/2012 | Spicer et al. |
| 8,454,463 | B2 | 6/2013 | Parsons |
| 8,460,152 | B2 | 6/2013 | Parsons et al. |
| 8,534,438 | B2 | 9/2013 | Antchak et al. |
| 8,627,935 | B2 | 1/2014 | Danciu et al. |
| 2003/0005784 | A1 | 1/2003 | Schnelle et al. |
| 2003/0019708 | A1* | 1/2003 | Goto ........................ F16D 27/02 192/35 |
| 2007/0037644 | A1 | 2/2007 | Mevissen et al. |
| 2007/0267264 | A1 | 11/2007 | Pederson |
| 2008/0020875 | A1 | 1/2008 | Serrels et al. |
| 2008/0045374 | A1 | 2/2008 | Weinberg et al. |
| 2008/0276892 | A1 | 11/2008 | Doljack |
| 2008/0312014 | A1 | 12/2008 | Stief et al. |
| 2009/0212626 | A1 | 8/2009 | Snyder et al. |
| 2009/0291794 | A1* | 11/2009 | Amanuma ............ F16D 41/088 474/171 |
| 2009/0298646 | A1* | 12/2009 | Parsons .................. F02N 11/04 477/167 |
| 2010/0006500 | A1 | 1/2010 | Cantwell et al. |
| 2010/0122882 | A1 | 5/2010 | Komorowski et al. |
| 2010/0230227 | A1* | 9/2010 | Parsons .................. B60K 25/02 192/65 |
| 2011/0083919 | A1* | 4/2011 | Kshatriya ............. B60W 20/15 180/65.26 |
| 2011/0112742 | A1 | 5/2011 | Losano et al. |
| 2011/0315502 | A1 | 12/2011 | Antchak et al. |
| 2013/0098727 | A1 | 4/2013 | Williams et al. |
| 2013/0118853 | A1 | 5/2013 | Champalou et al. |
| 2014/0008175 | A1 | 1/2014 | Schneider et al. |

FOREIGN PATENT DOCUMENTS

| | | |
|---|---|---|
| CN | 101326385 A | 12/2008 |
| CN | 102216639 A1 | 10/2011 |
| CN | 102483021 A | 5/2012 |
| CN | 102985716 A | 3/2013 |
| DE | 102011085138 | 6/2012 |
| WO | 9316585 A1 | 9/1993 |
| WO | 3104673 | 12/2003 |
| WO | 2009118834 A1 | 10/2009 |
| WO | 2010048732 | 5/2010 |
| WO | 2010054487 | 5/2010 |
| WO | 2010099605 | 9/2010 |
| WO | 2011017811 | 2/2011 |
| WO | 2008150349 | 10/2011 |
| WO | 2012135942 A1 | 10/2012 |
| WO | 2013033825 | 3/2013 |
| WO | 2013033825 A1 | 3/2013 |
| WO | 2013152430 | 10/2013 |
| WO | 2014205508 A1 | 12/2014 |

OTHER PUBLICATIONS

Office Action for CN201480062465.8 dated Feb. 5, 2018—English translation.
International Preliminary Report on Patentability for WO2012135942, dated Jul. 11, 2012.
Isolating Crankshaft Pulley with BAS and ISAF—Power Point Presentation, Litens Automotive Group, Oct. 17, 2013.
Ker-Train Bi-Directional/One Way Clutch Systems (Brochure), Ker-Train Research Inc. (http://www.kertrain.com/clutch.htm).
Ker-Train Company Brochure, Ker-Train Research Inc. (http://www.kertrain.com/clutch.htm).
Means Industries Mechanical Diode Clutch Info #1(pdf, p. 4)—Bi-Directional Controllable MD, 2001.
Means Industries Mechanical Diode Clutch Info #2, 2001.
Means Industries Mechanical Diode Clutch Info #3, 2001.
Means Industries Mechanical Diode Clutch Info #1 (pdf, p. 4)—Ford 5R110 Power Shift Transmission.
Means Industries Mechanical Diode Clutch Info #1 (pdf, pp. 1, 2), 1998.
Means Industries Mechanical Diode Clutches Info #1 (pdf, p. 3).
International Search Report for PCT/CA2012/000331, dated Jul. 11, 2012.
Roller Locking Mechanism Contains Two Overrunning Clutches, John M. Vranish of Goddard Space Flight Center.
Search Report and Written Opinion for PCT/CA2015/000020, dated Mar. 24, 2015.
Written Opinion for PCT/CA2012/000331, dated Jul. 11, 2012.
"Ultracapacitor Assisted Electric Devices for Transportation", Miller et al. (MaxwellTechnologies Inc.), Jun. 25, 1905.
International Search Report and Written Opinion for PCT/CA2014/000818, dated Feb. 5, 2015.
Office Action CN201180054087.5 dated Apr. 27, 2015, dated Apr. 27, 2015.
Office Action CN201180054087.5 dated Apr. 27, 2015—partial translation, dated Apr. 27, 2015.
Roller Locking Mechanism Contains Two Overrunning Clutches (article), John M. Vranish of Goddard Space Flight Center and Honeybee Robotics NY.
Office Action for U.S. Appl. No. 15/110,926 dated Dec. 4, 2018.
Office Action for CN201580004254.3 dated Jun. 5, 2018.
Office Action for CN201580004254.3 dated Jun. 5, 2018—English translation.
Office Action for CN201580004254.3 dated Oct. 29, 2018, Office Action for CN201480062465.8 is attached and considered, CN201580004254.3 is incorrectly listed and was considering in the Sep. 5, 2018 IDS.
Office Action for CN201580004254.3 dated Oct. 29, 2018—English translation, Office Action for CN201480062465.8 is attached and considered, CN201580004254.3 is incorrectly listed and was considered in the Sep. 5, 2018 IDS.

(56) References Cited

OTHER PUBLICATIONS

Office Action for CN201480062465.8 dated Jul. 23, 2019.

* cited by examiner

DECOUPLER WITH OVERRUNNING AND BELT-START CAPABILITY WITH SIMPLIFIED CONSTRUCTION

CROSS-REFERENCE TO RELATED APPLICATIONS

This application claims the benefit of U.S. Provisional Application No. 61/904,292, filed Nov. 14, 2013, the contents of which are incorporated herein by reference in their entirety.

FIELD OF INVENTION

This disclosure relates generally to the field of isolators for use between an engine crankshaft and a belt or other endless drive member, or between a shaft of an accessory such as an MGU or alternator and the endless drive member.

BACKGROUND OF INVENTION

It is known to provide an isolator on an engine crankshaft or on a belt-driven accessory, such as an MGU (motor generator unit) or an alternator, that is driven by a belt from the crankshaft of an engine in a vehicle. As is known, the crankshaft undergoes cycles of accelerations and decelerations associated with the firing of the cylinders in the engine. The isolator permits these accelerations and decelerations to occur with reduced effect on the speed of the belt. A problem with some isolators is that they do not provide 'decoupling' which permits overrunning of the belt and the pulley relative to the crankshaft of the engine. Some decouplers have been proposed which include powered clutches to provide decoupling and which also permit BAS (belt/alternator start) capability for the engine when desired. However, such decouplers can be complex. It would beneficial to provide a decoupler that at least partially addresses this problem.

SUMMARY

In an aspect, a clutched device is provided, including a hub, a pulley and a roller clutch. The hub defines an axis and is connectable to a rotatable shaft of a rotary device. The pulley is rotatable relative to the hub and is engageable with an endless drive member. The roller clutch includes at least one roller and a cage surrounding the at least one roller to guide the angular position of the at least one roller about the axis. The at least one roller is engageable with a first roller engagement surface that is operatively associated with the hub and is engageable with a second roller engagement surface that is operatively associated with the pulley. The cage is movable relative to at least one of the first and second roller engagement surfaces between a first position in which torque is transferrable from one of the hub and the pulley to the other of the hub and the pulley through the roller clutch and the isolation spring. The other of the hub and the pulley is permitted to overrun said one of the hub and the pulley, and a second position in which torque is transferred from said other of the hub and the pulley to the one of the hub and the pulley through the roller clutch.

In another aspect, a clutched device is provided for an engine for a vehicle. The engine has a crankshaft that is engaged with an endless drive member. The endless drive member is engaged with an electric motor that is operable to start the engine via the endless drive member. The vehicle further includes a vehicle battery. The clutched device includes a hub, a pulley, a clutch, a clutch actuator and a secondary power source. The hub defines an axis and is connectable to a rotatable shaft of a rotary device. The pulley is rotatable relative to the hub and is engageable with an endless drive member. The clutch actuator is electrically operated. The clutch is operable to control torque transfer between the hub and the pulley. The secondary power source is separate from the vehicle battery and that is operatively connected to the clutch actuator.

BRIEF DESCRIPTION OF THE DRAWINGS

The foregoing and other aspects of the disclosure will be more readily appreciated by reference to the accompanying drawings, wherein.

DETAILED DESCRIPTION OF EMBODIMENTS

Figure 1:
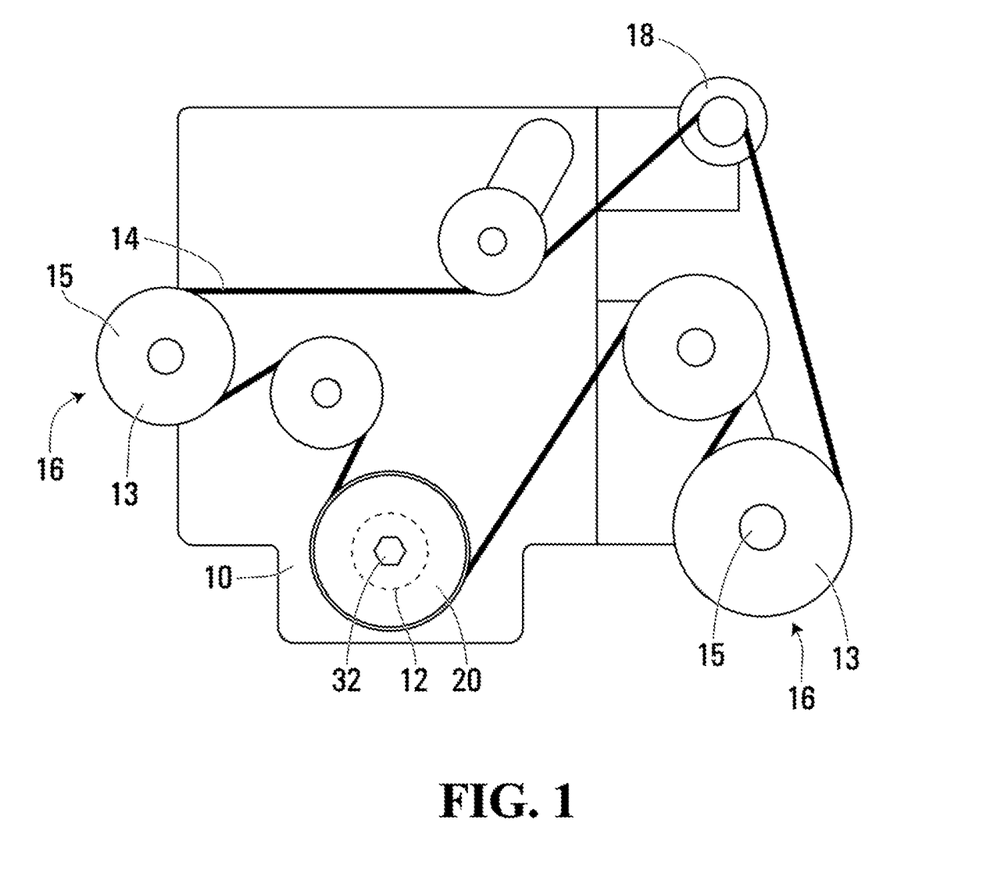
FIG. 1 is an elevation view of an engine with a belt drive with a clutched device in accordance with an embodiment of the present invention.

Reference is made to FIG. 1, which shows an engine 10 for a vehicle. The engine 10 includes a crankshaft 12 which drives an endless drive member 14, which may be referred to as a belt 14 for convenience, with the understanding that any other suitable endless drive member could instead be used. Via the belt 14, the engine 10 drives a plurality of accessories 16, such as an MGU (motor-generator unit) 18. Each accessory 16 includes an input drive shaft 15 with a pulley 13 thereon, which is driven by the belt 14. A clutched device 20 is shown on the engine crankshaft 12 and acts to control torque transfer between the crankshaft 12 and the belt 14. The clutched device 20 may be referred to as a decoupler 20, because it provides the capability to at least somewhat isolate the belt 14 from torsional vibrations in the crankshaft 12 and to provide overrunning capability at the belt 14, permitting the belt 14 to briefly overrun the crankshaft 12 as needed. The decoupler 12, in some embodiments, also provides the capability for the belt 14 to drive the crankshaft 12 so as to provide boost or BAS (belt/alternator start) capability to the engine 10.

Figure 2:
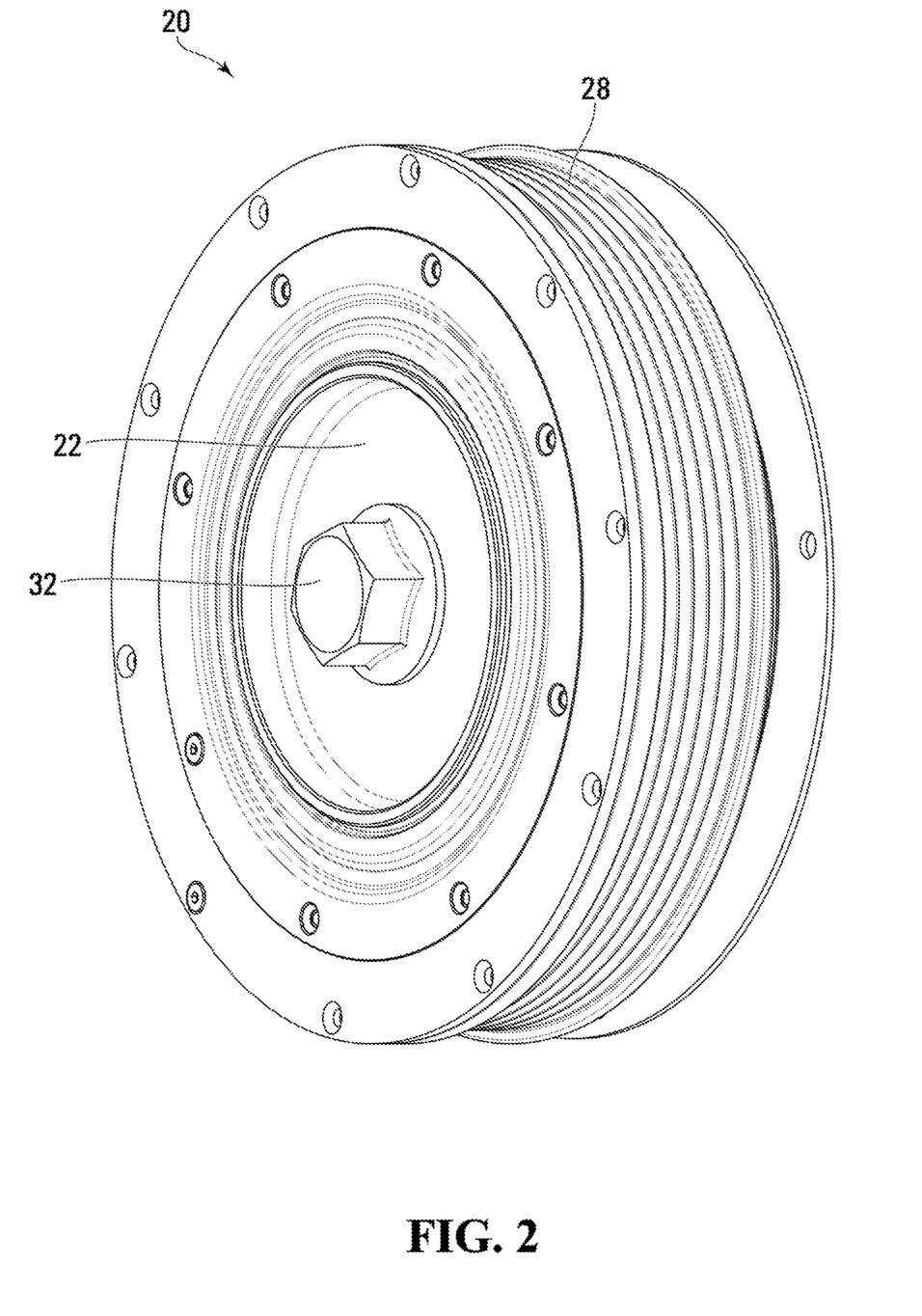
FIG. 2 is a magnified perspective view of the clutched device shown in FIG. 1.
Figure 3:
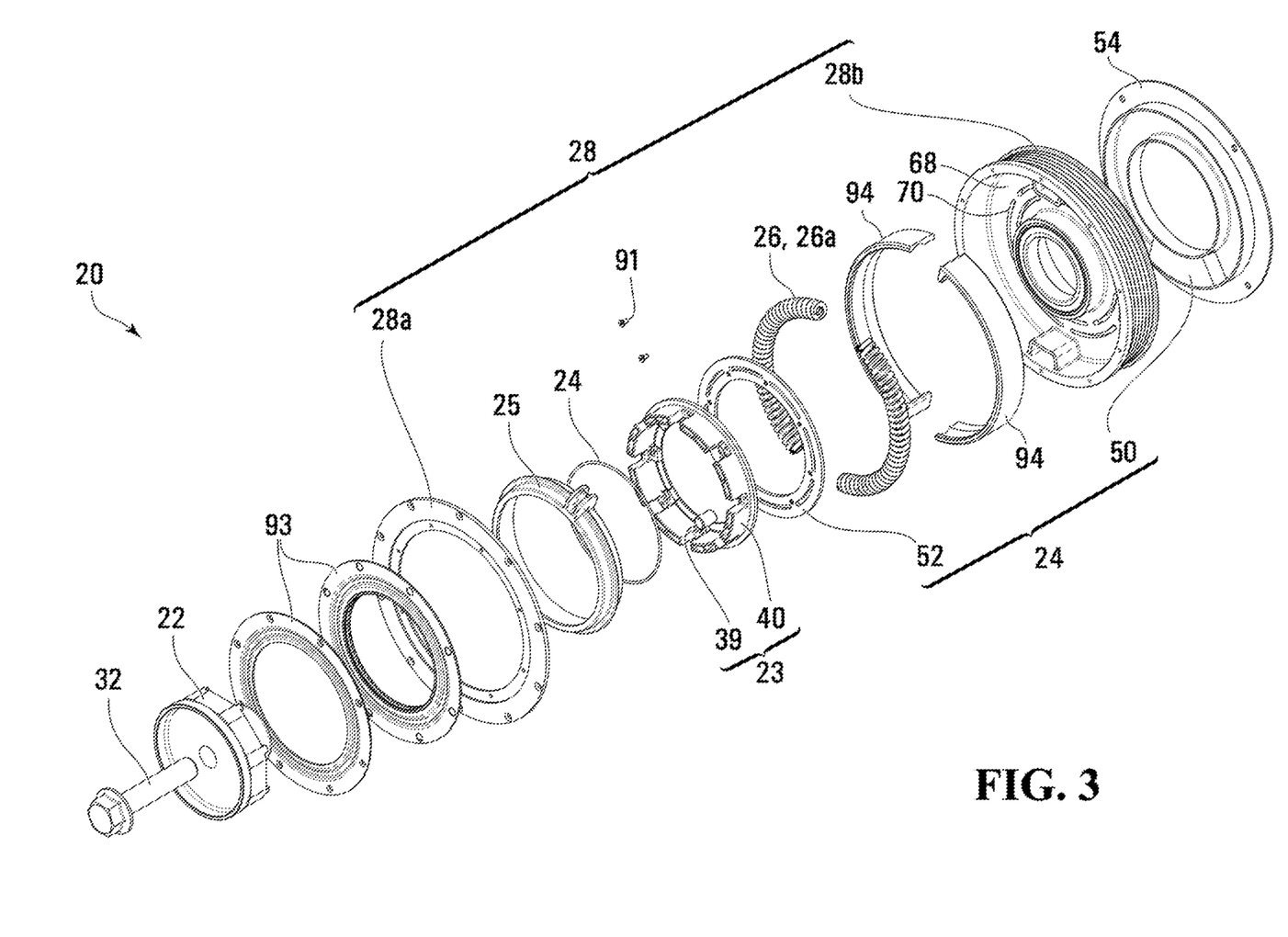
FIG. 3 is an exploded perspective view of the clutched device shown in FIG. 1.
Figure 4:
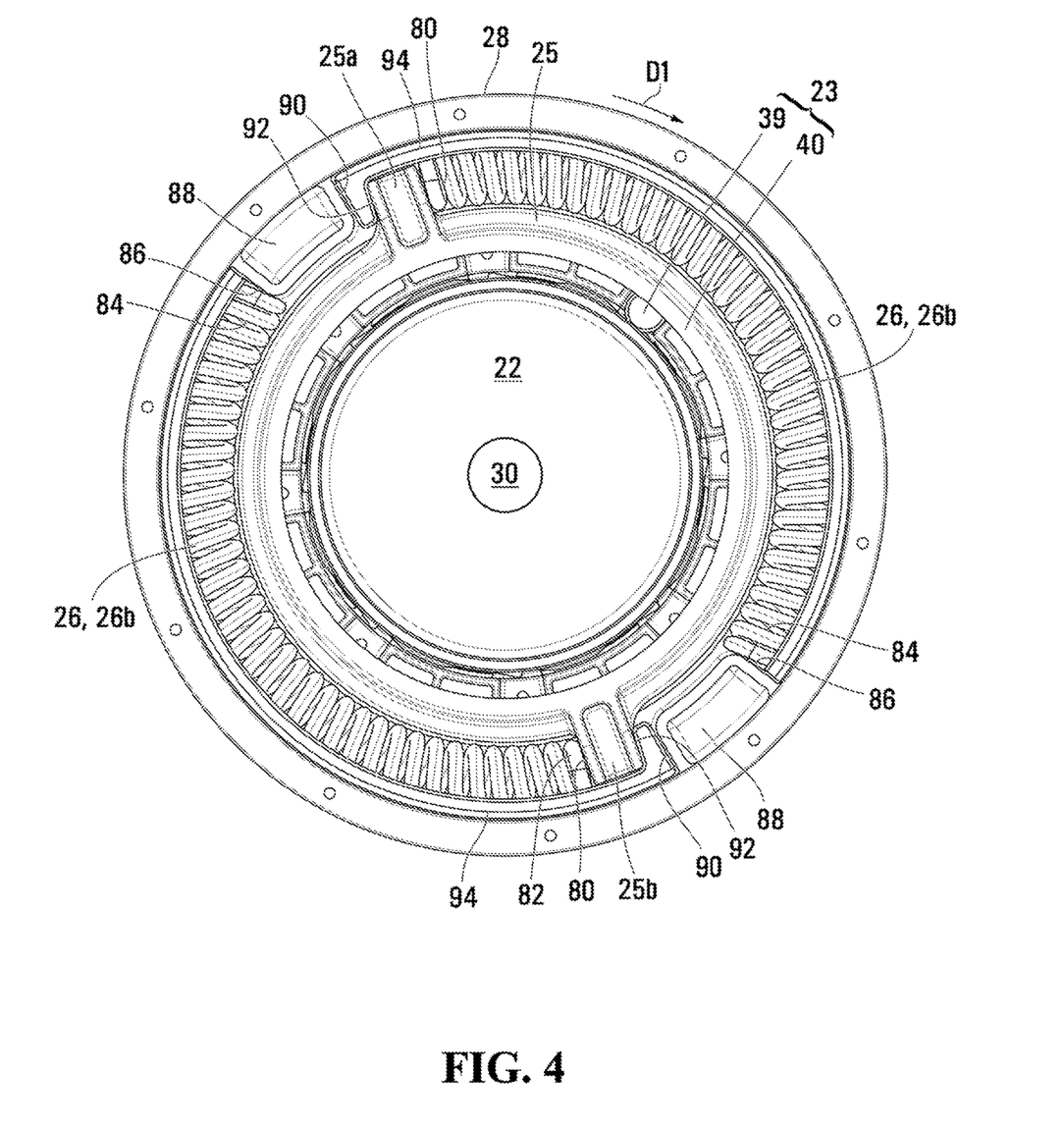
FIG. 4 is a sectional elevation view of the clutched device shown in FIG. 1.

The decoupler 20 is shown in an enlarged perspective view in FIG. 2, in a perspective exploded view in FIG. 3, and in a sectional elevation view in FIG. 4. As seen in FIGS. 2-4, the decoupler 20 includes a hub 22, a one-way clutch 23, a clutch actuator 24 (only a small section of which is shown in FIG. 3), an intermediate member 25, first and second isolation springs 26 (shown individually at 26a and 26b), and an isolator pulley 28.

The hub 22 may be adapted to mount to the crankshaft 12 (FIG. 1) in any suitable way. For example, the hub 22 may have an aperture 30 (FIG. 4) for a threaded fastener (shown at 32 in FIGS. 2, 3 and 5) that passes therethrough into threaded apertures (not shown) in the end of the crankshaft 12 (FIG. 1). The hub 22 defines an isolator axis A (FIG. 5) and is rotatable about the isolator axis A.

The hub 22 may include a support surface 34 for supporting a bearing 36 that in turn supports a bushing engagement surface 38 on the pulley 28 so as to permit relative rotation between the pulley 28 and the crankshaft 12 and hub 22. The bearing 36 may be any suitable type of bearing, such as a single row ball bearing. Alternatively any other suitable means of supporting the pulley 28 for rotation relative to the hub 22 may be used.

Figure 6:
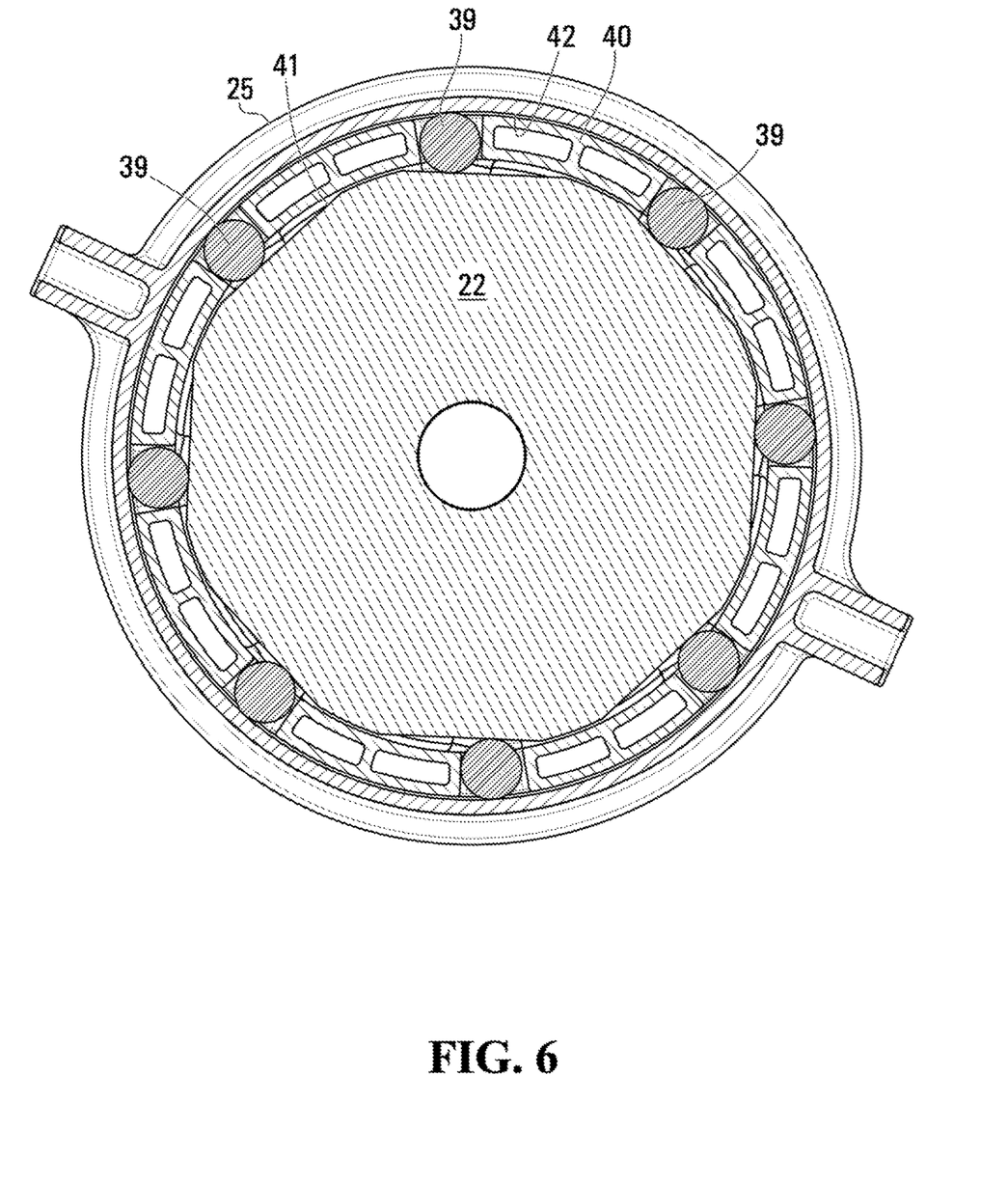
FIG. 6 is another sectional elevation view of the clutched device shown in FIG. 2 with some components removed.

The one-way clutch 23 is controllable to transfer torque from the hub 22 to the pulley 28 (during rotation in a first direction D shown in FIG. 6*a*), but to permit overrunning of the pulley 28 relative to the hub 22 in the first direction D), and also to permit torque transfer of the pulley 28 to the hub 22 in the first direction D when desired.

The one-way clutch 23 may be a roller clutch as shown in FIG. 6, and may include at least one roller 39 (in the embodiment shown there are eight such rollers 39) and a cage 40 surrounding the rollers 39 to guide the angular position of the rollers 39 about the axis A.

The rollers 39 are engageable with a first roller engagement surface 41 that is operatively associated with the hub 22 (in this case, the surface 41 is directly on the hub 22), and are engageable with a second roller engagement surface 42 that is operatively associated with the pulley 28. In the embodiment shown the surface 42 is on the intermediate member 25, which drives the pulley 28 through the isolation springs 26, as is described further below.

Figure 7A:
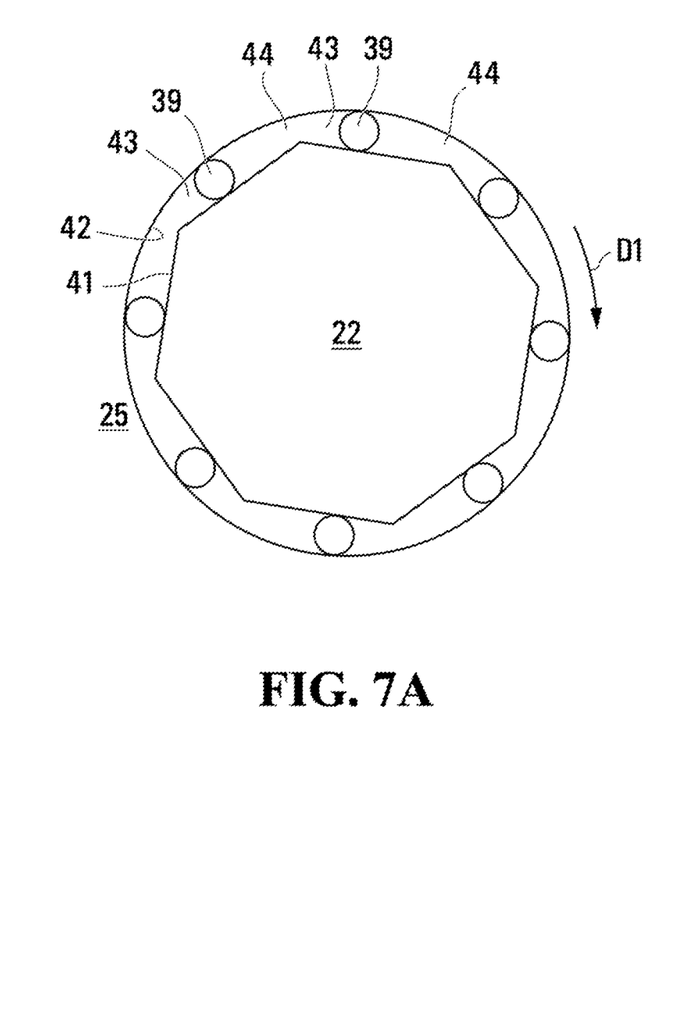
FIGS. 7A and 7B are simplified sectional perspective views of the clutched device shown in FIG. 2 showing rollers from a roller clutch in first and second positions respectively.
Figure 7B:
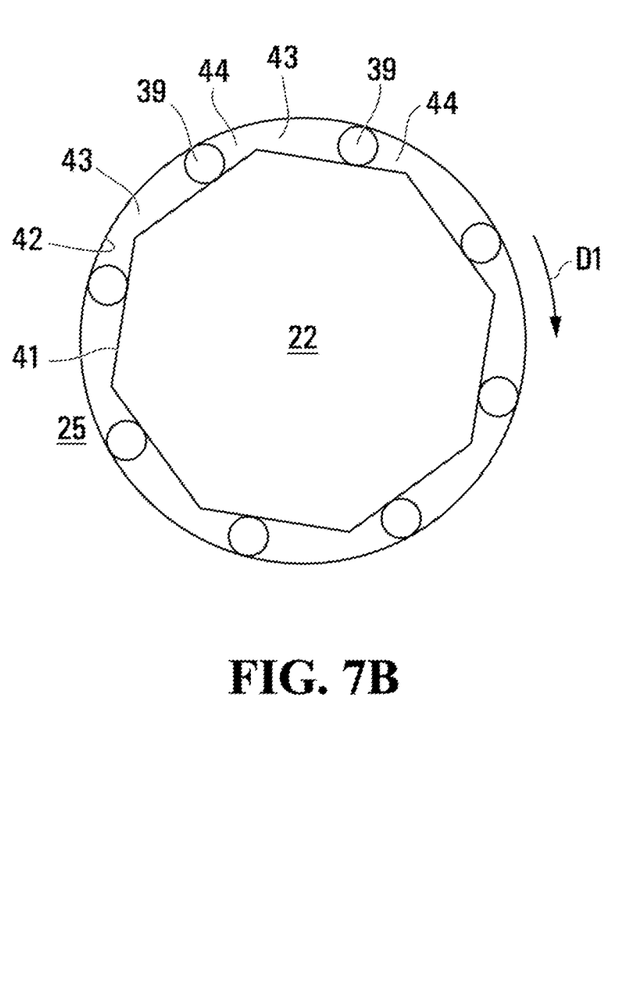

The cage 40 is movable (e.g. rotatable about axis A) relative to at least one of the first and second roller engagement surfaces 41 and 42 between a first position shown in FIG. 6 and FIG. 7A, and a second position shown in FIG. 7B. With reference to FIG. 7*a*, in the first position torque is transferrable from the hub 22 to the pulley 28 through the roller clutch 23 and the isolation springs 26 (and the intermediate member 25, if provided). Also when in the first position, as shown in FIG. 7B, the pulley 28 is permitted to overrun the hub 22. It can be seen in FIG. 7A that rotation of the hub 22 in the direction D1 maintains a wedging force on the rollers 39 so that torque transfer can take place, while the rotation of the surface 42 from the intermediate member 25 does not maintain a wedging force on the rollers 39 and so little or no torque transfer takes plate. When in the second position (FIG. 7B), the rollers 39 have been moved to the second ends of their individual plateaus, shown at 45, so that torque can be transferred from the pulley 28 to the hub 22 through the roller clutch 23 due to the wedging force that would result on the rollers 39. While the cage 40 itself is not shown in FIGS. 7A and 7B, for simplicity, it will be understood that the positions of the rollers 39 defines the position of the cage 40 and vice versa. In other words, if the positions of the rollers 39 are known then the position of the cage 40 is known, and vice versa.

As can be seen in FIG. 6, the first and second roller engagement surfaces 41 and 42 cooperate to form at least one first wedging corner 43 and at least one second wedging corner 44. In the embodiment shown there are eight first and second wedging corners 43 and 44 (i.e. one first wedging corner 43 and one second wedging corner 44 for every roller 39). Engagement of the rollers 39 with the first wedging corners 43 permits torque transfer from the hub 22 to the pulley 28. Engagement of the rollers 39 with the second wedging corners permits torque transfer from the pulley 28 to the hub 22. Referring to FIG. 7A where even though the cage 40 is not shown its position is implied by the positions of the rollers 39 themselves as noted above, when the cage 40 is in the first position the rollers 39 are engaged with the first wedging corner 43, and when the cage 40 is in the second position the rollers 39 are engaged with the second wedging corners 44.

Figure 8:
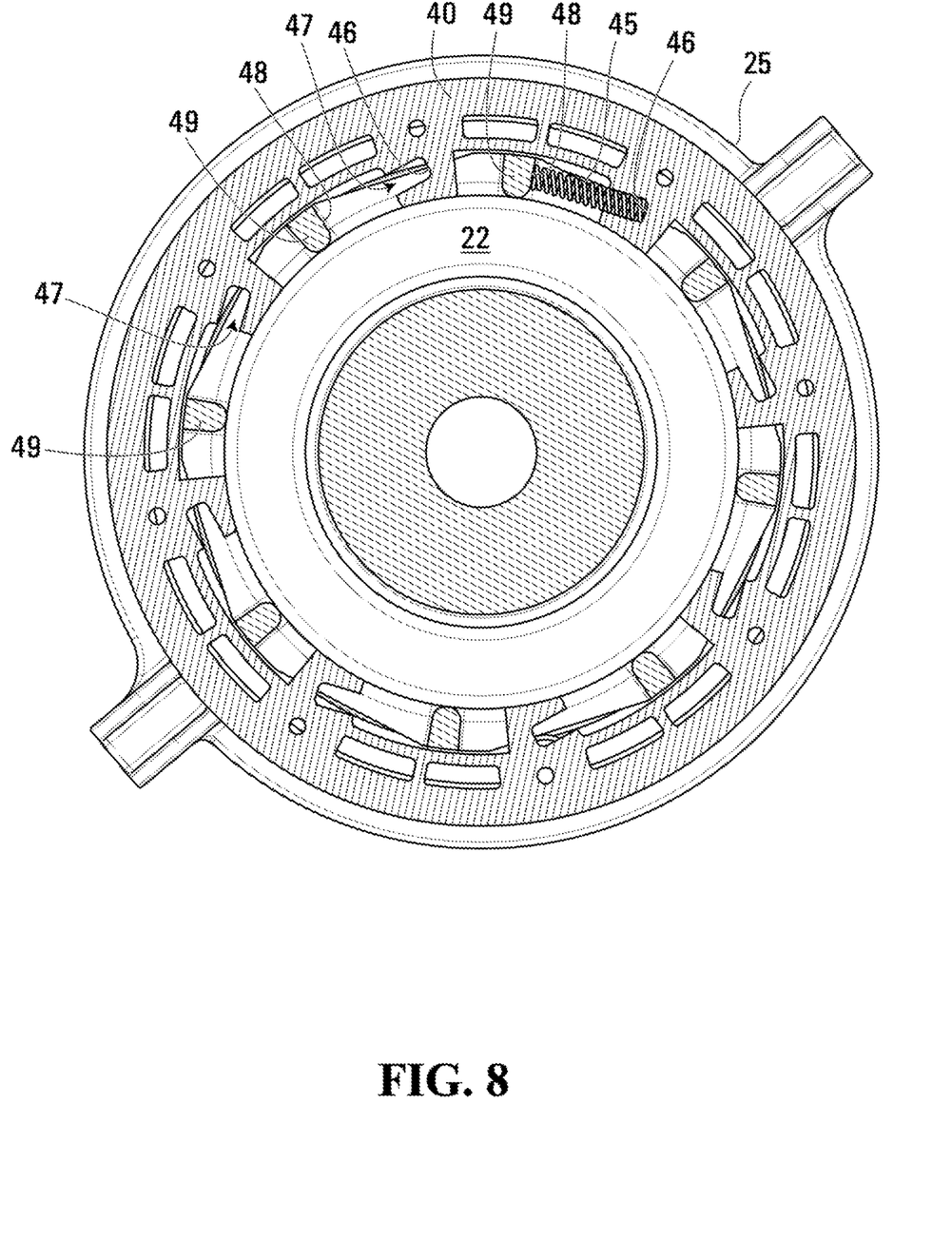
FIG. 8 is another sectional elevation view of the clutched device, similar to FIG. 6 but from an opposing viewpoint.

Referring to FIG. 8, the roller clutch 23 further includes at least one cage biasing member 45 that urges the cage 40 towards the first position. In the embodiment shown, there may be eight biasing members 45 although only one is shown, for simplicity. The biasing members 45 may act between first cage biasing member engagement surfaces 46 on the cage 40 (e.g. at the blind ends of pockets 47 shown in FIG. 8), and second cage biasing member engagement surfaces 48 on the hub 22 (e.g. on axial/radial fins 49 on the hub 22).

Figure 5:
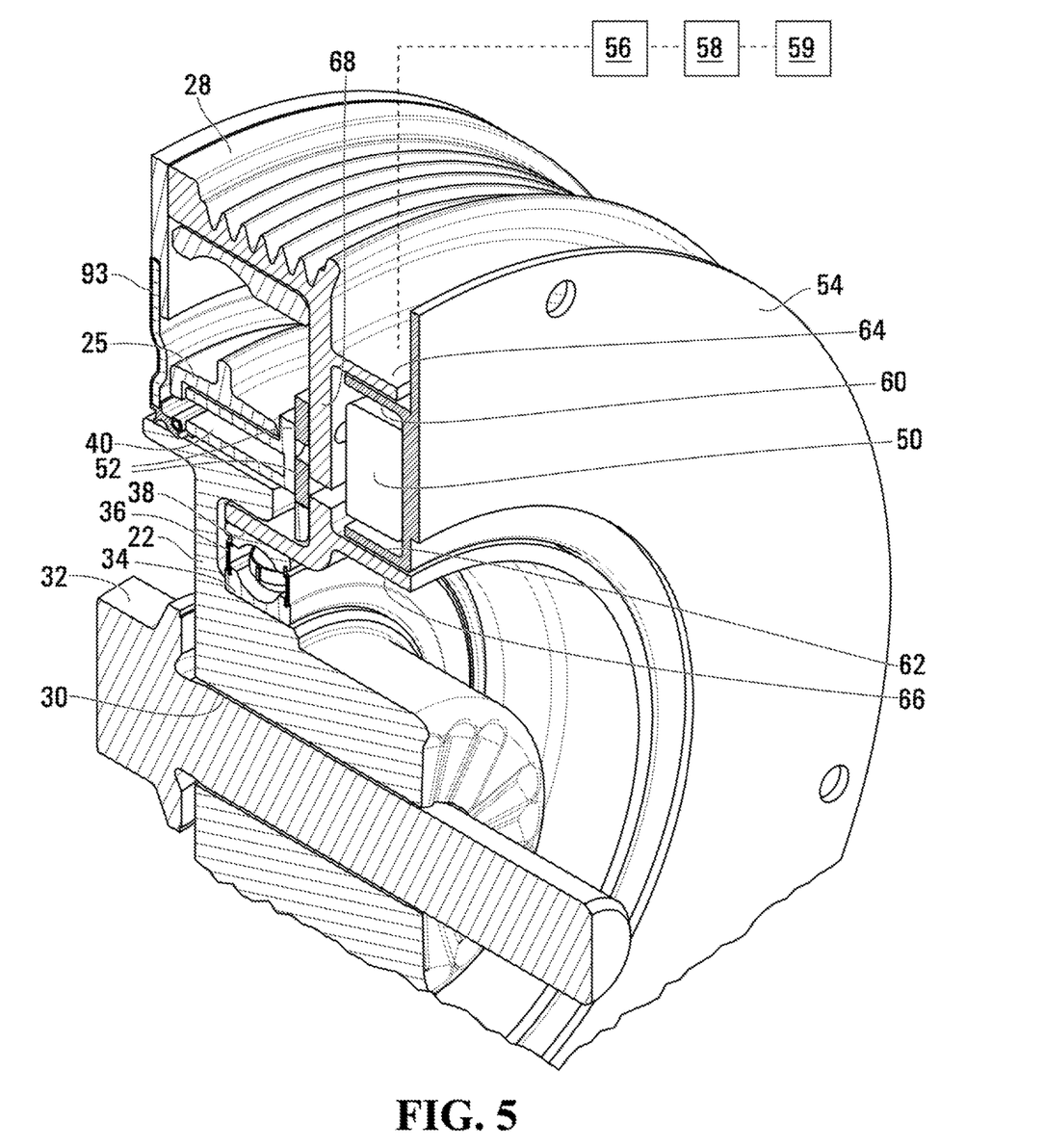
FIG. 5 is another sectional elevation view of the clutched device shown in FIG. 2 in another sectional plane.

The clutch actuator 24 is shown in FIG. 5, and includes an electromagnetic coil 50 and an armature 52. The electromagnetic coil 50 is mounted in a coil housing 54 that is itself mountable (e.g. via threaded fasteners) to a stationary surface such as a portion of a mounting bracket for the engine 10. The coil 50 is connected to a control system 56 and to a power source 58. The power source 58 may be any suitable power source such as the vehicle battery or some other power source such as a supercapacitor as described further below. In the embodiment shown, the power source 58 is a secondary power source and is connected to the vehicle battery shown at 59.

Axially overlapping flanges 60 and 62 and 64 and 66 on the housing 54 and the pulley 28 control transfer of magnetic flux from the coil 50 into the pulley wall shown at 68. Apertures 70 (in the form of circumferentially extending slots) in the pulley wall 68 control the magnetic flux exerted from the coil 50 on the armature 52 within the pulley 28. The slots 70 may be filled with a non-magnetic (e.g. suitable polymeric) material for sealing purposes.

Energization of the coil 50 draws the armature 52 axially into engagement with the pulley wall 68. The armature 52 is rotationally connected to the cage 40. Friction of the armature 52 against the pulley wall 68 overcomes the biasing members 45 and drives the cage 40 and the rollers 39 rotationally relative to the hub 22 (and the pulley 28) to the second position in which the rollers 39 are at the second wedging corners 44, against the bias of the cage biasing members 45. Deenergization of the coil 50 reduces or eliminates the friction between the armature 52 and the pulley wall 68 thereby causing the cage 40 and the rollers 39 to move to the first position under the urging of the cage biasing members 45, bringing the rollers 39 to the first wedging corners 43.

Referring to FIG. 4, the intermediate member 25 transfers torque from the hub 22 (via the roller clutch 23) to the isolation springs 26. In the example embodiment shown, the intermediate member 25 is a polymeric or metallic member that is supported on the rollers 39. The intermediate member 25 has drive arms 25*a* and 25*b* thereon that have first sides 80 with first spring end engagement surfaces thereon, that engage first ends 82 of the isolation springs 26. Optionally a single drive arm or three or more drive arms could be provided.

The isolation springs 26 elastically deform to isolate the endless drive member 14 and the crankshaft 12 from vibrations or other sudden changes in torque in one another. In the specific embodiment shown, the isolation springs 26 transfer force between the hub 22 and the pulley 28 via the roller clutch 23 and the intermediate member 25.

The springs 26 in the examples shown are arcuate, helical coil compression springs made from any suitable material such as spring steel. However, any other suitable type of springs could be used, such as, for example, closed cell foam or PTU springs. The springs 26 operate in parallel. A single isolation spring 26 may be provided, or three or more springs 26 instead of the two springs 26 shown.

The springs 26 have second ends 84 that engage second spring end engagement surfaces 86 provided on a first side of the lugs 88 on the pulley 28. The second sides of the lugs 88 are shown at 90 and have engagement surfaces that engage second sides 92 of the drive arms 25a and 25b.

Insulator members shown at 94 may be provided so as to inhibit noise caused in the event of impact between the lugs 88 and the drive arms 25a and 25b. The insulator members 94 may be polymeric. Additionally, the insulator members 94 may prevent contact between the radially outer surface of the springs 26 and the inner surface of the pulley 28. Optionally, the isolation springs 26 may be preloaded so as to help keep all the components engaged at least when the clutched device 20 is in a home position. However, there will be relative angular movement between the lugs 88 and the drive arms 25a and 25b that results from compression of the springs 26 during torque transfer from the hub 22 to the pulley 28 during normal operation of the engine 10.

The pulley 28 is supported for rotation relative to the crankshaft 12 via the bearing 36 and is engageable with the belt 14. It will be noted that the term 'belt' is used for convenience, but instead it may be any suitable endless drive member. Analogously, the term 'pulley' is used for convenience, but instead it may be any suitable rotary member that is engageable with the endless drive member.

The pulley 28, in the embodiment shown has a belt engagement surface 72 that is configured to engage a poly-V groove belt. The pulley 28 may be made from two elements including a main portion 28a and a cover member 28b that is connected to the main portion 28a via any suitable means (e.g. by means of fasteners, one of which is shown in FIG. 3 at 91). The pulley 28 may be made from any suitable material such as a suitable metal, such as steel.

A two-piece seal member is shown at 93 in FIGS. 3 and 5, which, among other things inhibits dust and debris from entering the interior of the clutched device 20.

When the engine crankshaft 12 is intended to drive the belt 14 (FIG. 1) through the clutched device 20 the clutch actuator 24 may be deenergized such that the cage 40 and rollers 39 are in the first position, permitting torque transfer through the device 20 from the hub 22 to the pulley 28. In this mode, torque transfer takes place from the hub 22 through the roller clutch 23 (through the rollers 39 specifically) into the intermediate member 25. From the drive arms 25a and 25b of the intermediate member 25 torque is transferred into the isolation springs 26 and through the springs 26 into the pulley 28. From the pulley 28 torque is transferred to the belt 14 (FIG. 1).

In the event that the belt 14 overruns the crankshaft 12 the cage biasing members 45 prevent movement of the rollers 39 to the second wedging corners 44 and so torque (aside from some small amount of frictional torque) is not transferred back to the hub 22 from the pulley 28. Thus the clutched device 20 acts as a decoupler permitting overrunning of the belt 14 relative to the crankshaft 12.

In the event that the control system 56 receives a command to provide boost to the engine 10 or to start the engine 10 using the MGU 18 via the belt 14, the control system 56 energizes the clutch actuator 24 (and specifically the coil 50) to cause movement of the cage 40 and the rollers 39 to the second position so as to bring the rollers 39 to the second wedging corner 44 against the urging or the bias of the cage biasing members 45. As a result, rotation of the pulley 28 in the direction D1 (due to being driven by the belt 14, which is, itself driven by the MGU 18), transfers torque from the lugs 88 into the drive arms 25a and 25b and therefore into the intermediate member 25. From the intermediate member 25 torque is transferred through the roller clutch 23 (specifically through the rollers 39) into the hub 22 and thus into the crankshaft 12. From this description, it will be noted that, when the cage 40 is in the second position, torque transfer from the pulley 28 to the hub bypasses the isolation springs 26.

It has been described above that the power source 58 could be the vehicle battery, or it could be a secondary power source such as a supercapacitor. In such an instance (i.e. where it is a secondary power source), the power source 58 can be used to start the engine 10 via a BAS system even in an event where the vehicle battery was dead for whatever reason, preventing the vehicle battery from being used to start the engine using a standard starter motor. Additionally or alternatively, it is possible to provide an embodiment where the starter motor (not shown) is eliminated altogether, and for the secondary power source to be used at all times to start the engine 10. In any case, in embodiments where the power source 58 is a secondary power source and is not the vehicle battery itself, the secondary power source 58 may draw power from the vehicle battery and may thus maintain a sufficient level of charge itself to start the engine 10 as needed.

While it is beneficial to provide the decoupler 20 on the crankshaft 12 of the engine, it is alternatively possible to mount an embodiment of the decoupler 20 on the shaft of the MGU 18. In some cases, there is no place for it on the crankshaft due to the need to provide other components on the crankshaft such as a torsional vibration damper pulley. In some embodiments it is contemplated that it may be less expensive to provide an isolator on the MGU 18 since the pulley and drive shaft for the MGU is inherently smaller than the pulley on the crankshaft 12 thereby permitting smaller components than would be permitted on the crankshaft 12.

It has been shown for the roller clutch 23 to be provided between the hub 22 and the intermediate member 25 and for the isolation springs 26 to be provided between the intermediate member 25 and the pulley 28. It is, however, alternatively possible to provide the isolation springs 26 between the hub 22 and the intermediate member 25 and to provide the roller clutch 23 between the intermediate member 25 and the pulley 28.

Those skilled in the art will understand that a variety of modifications may be effected to the embodiments described herein without departing from the scope of the appended claims.

The invention claimed is:

1. A clutched device for an engine for a vehicle, wherein the engine has a crankshaft that is engaged with an endless drive member, wherein the endless drive member is engaged with an electric motor that is operable to start the engine via the endless drive member, wherein the vehicle further includes a vehicle battery, wherein the clutched device comprises:
a hub defining an axis and connectable to one of a rotatable shaft of a rotary device that is not the engine, or the crankshaft of the engine;
a pulley that is rotatable relative to the hub and that is engageable with the endless drive member;

a clutch;

a clutch actuator that is electrically operated, wherein the clutch is operable to control torque transfer between the hub and the pulley; and a secondary power source that is separate from the vehicle battery and that is operatively connected to the clutch actuator to operate the clutch actuator even if the vehicle battery is dead.

2. The clutched device as claimed in claim 1, wherein the secondary electrical storage device is a supercapacitor.

3. The clutched device as claimed in claim 1, wherein the clutch is a roller clutch including at least one roller and a cage surrounding the at least one roller to guide an angular position of the at least one roller about the axis, wherein the at least one roller is engageable with a first roller engagement surface that is operatively associated with the hub and is engageable with a second roller engagement surface that is operatively associated with the pulley, wherein the cage is movable relative to at least one of the first and second roller engagement surfaces by the clutch actuator, between a first position in which torque is transferrable from one of the hub and the pulley to the other of the hub and the pulley through the at least one roller, and wherein said other of the hub and the pulley is permitted to overrun said one of the hub and the pulley, and a second position in which torque is transferred from said other of the hub and the pulley to said one of the hub and the pulley through the at least one roller.

4. The clutched device as claimed in claim 3, wherein the hub is connected to the crankshaft of the engine and the endless drive member is engaged with a pulley on a motor/generator unit, and wherein said one of the hub and the pulley is the hub and the other of the hub and the pulley is the pulley.

5. The clutched device as claimed in claim 3, further comprising an electromagnetic unit and an armature, wherein the electromagnetic unit is energizable and deenergizable to move the armature between a first armature position and a second armature position, wherein the armature is operatively connected to the cage to control a rotational position of the cage relative to said at least one of the hub and the pulley.

6. The clutched device as claimed in claim 5, wherein the first and second roller engagement surfaces cooperate to form at least one first wedging corner and at least one second wedging corner, wherein engagement of the at least one roller with the at least one first wedging corner permits torque transfer from said one of the hub and the pulley to said other of the hub and the pulley and wherein engagement of the at least one roller with the at least one second wedging corner permits torque transfer from said other of the hub and the pulley to said one of the hub and the pulley and wherein when the cage is in the first position the at least one roller is engaged with the at least one first wedging corner, and wherein when the cage is in the second position the at least one roller is engaged with the at least one second wedging corner.

7. The clutched device as claimed in claim 6, wherein the roller clutch further includes at least one cage biasing member that urges the cage towards the first position, and wherein deenergization of the electromagnetic coil causes the cage to move to the first position by the at least one cage biasing member and wherein energization of the electromagnetic coil causes the cage to move to the second position against the bias of the at least one cage biasing member.

8. The clutched device as claimed in claim 5, wherein the armature is moved axially by energization of the electromagnetic coil so as to cause frictional engagement between the armature and the pulley, wherein the armature is rotationally connected to the cage, wherein frictional engagement of the armature with the pulley during energization of the electromagnetic coil causes said movement of the cage to the second position.

9. The clutched device as claimed in claim 3, wherein the clutched device further includes an isolation spring positioned in series with the at least one roller such that when the cage is in the first position torque is transferrable from one of the hub and the pulley to the other of the hub and the pulley through the at least one roller and the isolation spring, and wherein when the cage is in the second position, torque transfer from said other of the hub and the pulley to said one of the hub and the pulley bypasses the isolation spring.

10. The clutched device as claimed in claim 9, wherein the isolation spring has a first end and a second end, and wherein said one of the hub and the pulley includes at least one drive arm, wherein a first side of the at least one drive arm is engageable with the first end of the isolation spring and wherein the pulley has at least one lug, wherein a first side of the at least one lug is engageable with the second end of the isolation spring, and wherein a second side of the at least one lug is engageable with a second side of the at least one drive arm.

11. The clutched device as claimed in claim 10, wherein the isolation spring is a first of two isolation springs.

* * * * *